United States Patent
Brooks et al.

(10) Patent No.: US 9,968,023 B2
(45) Date of Patent: May 15, 2018

(54) SYSTEMS AND METHODS FOR ADJUSTING WHEEL SPACING OF AN AGRICULTURAL IMPLEMENT

(71) Applicant: CNH Industrial America LLC, New Holland, PA (US)

(72) Inventors: Nathan Paul Brooks, Manitowoc, WI (US); Roy Anthony Bittner, Reedsville, WI (US); William Allen Roach, Lake Lillian, MN (US)

(73) Assignee: CNH Industrial America LLC, New Holland, PA (US)

( * ) Notice: Subject to any disclaimer, the term of this patent is extended or adjusted under 35 U.S.C. 154(b) by 162 days.

(21) Appl. No.: 15/175,937

(22) Filed: Jun. 7, 2016

(65) Prior Publication Data

US 2017/0347518 A1    Dec. 7, 2017

(51) Int. Cl.
| | |
|---|---|
| *G06F 7/70* | (2006.01) |
| *G06F 19/00* | (2011.01) |
| *G06G 7/00* | (2006.01) |
| *G06G 7/76* | (2006.01) |
| *A01B 63/02* | (2006.01) |
| *B60N 2/00* | (2006.01) |
| *B62D 49/06* | (2006.01) |
| *B60B 23/12* | (2006.01) |

(52) U.S. Cl.
CPC ............ *A01B 63/026* (2013.01); *B60B 23/12* (2013.01); *B60N 2/002* (2013.01); *B62D 49/0678* (2013.01)

(58) Field of Classification Search
CPC ........ A01B 63/026; B60B 23/12; B60N 2/12; B62D 49/067; B62D 49/0678
See application file for complete search history.

(56) References Cited

U.S. PATENT DOCUMENTS

| | | |
|---|---|---|
| 4,828,071 A | 5/1989 | Gaede |
| 5,454,583 A | 10/1995 | Torborg |
| | (Continued) | |

FOREIGN PATENT DOCUMENTS

| | | |
|---|---|---|
| CN | 103231625 A | 8/2013 |
| CN | 103253077 B | 6/2015 |
| | (Continued) | |

OTHER PUBLICATIONS

STS 12 Operator's Manual 493211, Hagie Manufacturing Company, 2000, 98 pages.

(Continued)

*Primary Examiner* — Rachid Bendidi
(74) *Attorney, Agent, or Firm* — Rebecca L. Henkel; Rickard K. DeMille (57) ABSTRACT

A wheel adjustment system for an agricultural implement includes a controller having a processor and a memory. The processor is configured to receive a first signal indicative of a ground speed of the agricultural implement, receive a second signal indicative of a desired position of a wheel of the agricultural implement, receive a third signal indicative of a current position of the wheel of the agricultural implement, and output a control signal to adjust a position of the wheel of the agricultural implement based on the first signal, the second signal, and the third signal, wherein a rate of adjustment of the position of the wheel varies based on the first signal.

20 Claims, 6 Drawing Sheets

(56) References Cited

U.S. PATENT DOCUMENTS

| | | | |
|---|---|---|---|
| 5,489,113 A | 2/1996 | Torborg | |
| 6,058,342 A * | 5/2000 | Orbach | A01B 63/1006 |
| | | | 172/2 |
| 6,311,795 B1 | 11/2001 | Skotnikov et al. | |
| 6,584,390 B2 | 6/2003 | Beck | |
| 6,688,403 B2 | 2/2004 | Bernhardt et al. | |
| 6,779,623 B2 | 8/2004 | Woods et al. | |
| 6,827,176 B2 | 12/2004 | Bean et al. | |
| 6,892,124 B2 * | 5/2005 | Humpal | B60B 35/1054 |
| | | | 280/209 |
| 7,163,227 B1 | 1/2007 | Burns | |
| 7,717,210 B2 | 5/2010 | Mahy et al. | |
| 7,735,176 B2 * | 6/2010 | Riach | B60B 35/003 |
| | | | 15/78 |
| 7,780,197 B2 * | 8/2010 | White | B60G 9/02 |
| | | | 280/781 |
| 8,280,590 B2 | 10/2012 | Mackin et al. | |
| 8,746,388 B2 | 6/2014 | Budweil | |
| RE45,405 E | 3/2015 | Humpal et al. | |
| 9,352,782 B2 | 5/2016 | Tollefsrud et al. | |
| 2005/0027421 A1 * | 2/2005 | Humpal | B60B 35/1054 |
| | | | 701/50 |
| 2012/0025477 A1 * | 2/2012 | Mackin | B60B 35/1054 |
| | | | 280/5.522 |
| 2013/0062133 A1 * | 3/2013 | Budweil | B60B 35/1063 |
| | | | 180/209 |
| 2015/0102586 A1 * | 4/2015 | Tollefsrud | B62D 49/0678 |
| | | | 280/638 |

FOREIGN PATENT DOCUMENTS

| | | |
|---|---|---|
| JP | 61220902 | 10/1986 |
| JP | S63195002 A | 8/1988 |
| JP | 10044705 | 2/1998 |
| WO | 9950128 A1 | 10/1999 |
| WO | 03046291 A1 | 6/2003 |

OTHER PUBLICATIONS

MH-Series Mobile Hydraulic in-Cylinder Sensor, Model MH Agri Analog Output Data Sheet, Document Part No. 551309, Revision A, 11/12, MTS Systems Corporation, 2012, 8 pages.

Hitchcox, Alan, LDT lets RoGator adapt to the task at hand, Hydraulics & Pneumatics, Jan. 14, 2013, 3 pages.

* cited by examiner

SYSTEMS AND METHODS FOR ADJUSTING WHEEL SPACING OF AN AGRICULTURAL IMPLEMENT

BACKGROUND

The present disclosure relates generally to agricultural implements, and more particularly to systems and methods for adjusting wheel spacing of an agricultural implement.

Certain agricultural implements (e.g., sprayers) are used to distribute agricultural product (e.g., fertilizer) as the agricultural implement travels across a field. The agricultural implement may improve crop yield and/or farming efficiency by increasing the speed at which the agricultural product is distributed. Typically, rows of crops are planted with predetermined row spacing. Unfortunately, fixed spacing between wheels of the agricultural implement may limit the row spacing options available to an operator or may cause the agricultural implement to run over and/or to damage the rows of crops in the field.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a wheel adjustment system for an agricultural implement includes a controller having a processor and a memory. The processor is configured to receive a first signal indicative of a ground speed of the agricultural implement, receive a second signal indicative of a desired position of a wheel of the agricultural implement, receive a third signal indicative of a current position of the wheel of the agricultural implement, and output a control signal to adjust a position of the wheel of the agricultural implement based on the first, second, and third signal, wherein a rate of adjustment of the position of the wheel varies based on the first signal.

In one embodiment, a wheel adjustment system for an agricultural implement includes a controller having a processor and a memory. The processor is configured to receive a first signal indicative of a ground speed of the agricultural implement, receive a second signal indicative of a desired position of a wheel of the agricultural implement, receive a third signal indicative of a current position of the wheel of the agricultural implement, and a fourth signal indicative of a weight of the agricultural implement. The processor is also configured to output a control signal to adjust a position of the wheel of the agricultural implement based on the first, second, third, and fourth signals.

In one embodiment, a method of operating a wheel adjustment system for an agricultural implement includes a controller having a processor and a memory to receive a first signal indicative of a ground speed of the agricultural implement, receive a second signal indicative of a desired position of a wheel of the agricultural implement, receive a third signal indicative of a current position of the wheel of the agricultural implement, and a fourth signal indicative of a weight of the agricultural implement. The method also includes using the controller to output a control signal to adjust a position of the wheel of the agricultural implement based on the first, second, third, and fourth signals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
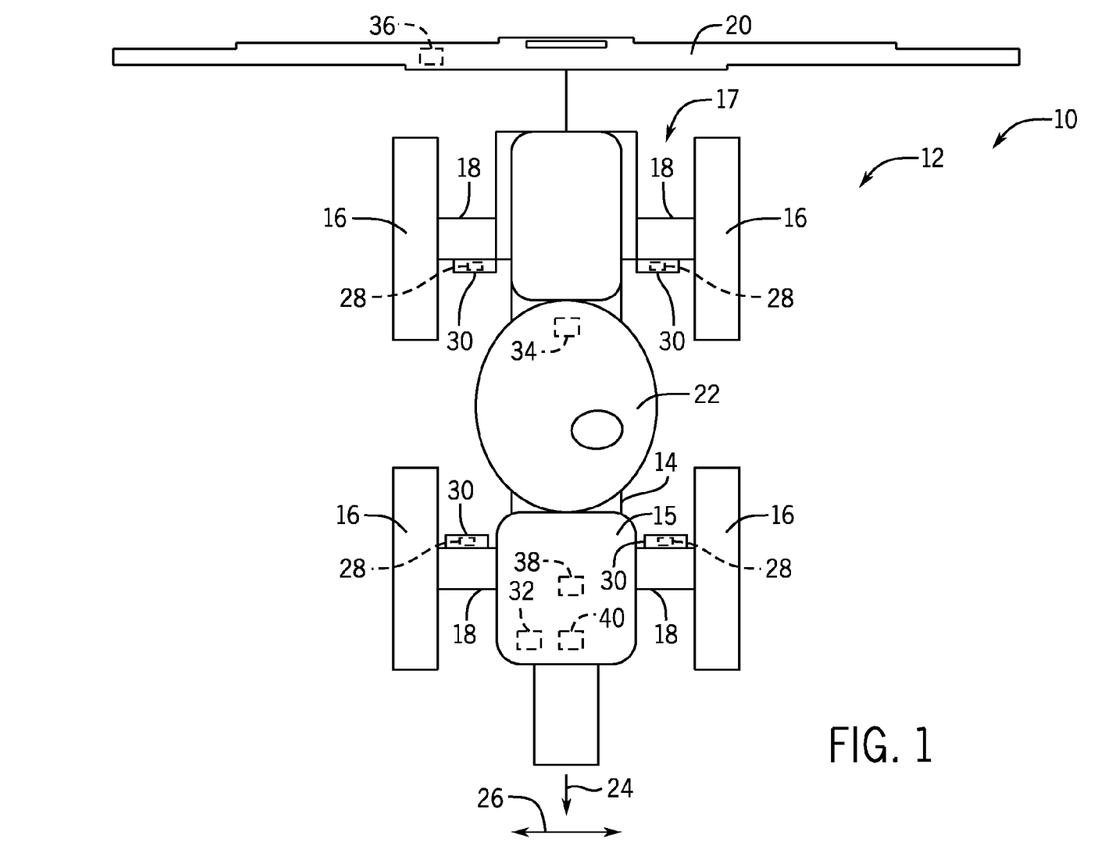
FIG. 1 is a top view of an embodiment of an agricultural implement having a wheel adjustment system.

FIG. 1 is a top view of an embodiment of an agricultural implement 10 having a wheel adjustment system 12 (e.g., tread width adjustment system or wheel spacing adjustment system). In the illustrated embodiment, the agricultural implement 10 is a sprayer, although it should be understood that the wheel adjustment system 12 disclosed herein may be used with any of a variety of agricultural implements (e.g., planter, harvester, or the like) or vehicles (e.g., off-road vehicle, tractor, truck, or the like). In the illustrated embodiment, the agricultural implement 10 includes a frame 14 and a cab 15 supported above the ground by wheels 16 (e.g., wheels or tracks). As shown, a wheel support assembly 17 (e.g., adjustable wheel support assembly) includes multiple axles 18 (e.g., adjustable axles or telescoping axles) that each extend between the frame 14 and a respective one of the wheels 16. The agricultural implement 10 may include a boom 20 (e.g., laterally extending arms) to facilitate application of an agricultural product to the field and a storage chamber 22 (e.g., tank) to store the agricultural product.

The agricultural implement 10 is configured to travel forward in a direction of travel 24 across a field, and the wheel adjustment system 12 is configured to cause the wheels 16 to move laterally 26 (e.g., inwardly and outwardly between an innermost position and an outermost position, generally perpendicular to the direction of travel 24). In the illustrated embodiment, at least a portion of each axle 18 is configured to move (e.g., shift, telescope, extend, retract, etc.) laterally 26 relative to the frame 14 to cause the respective wheel 16 to move laterally 26 relative to the frame 14. Accordingly, in the illustrated embodiment, each of the wheels 16 may move independently or separately via adjustment of the corresponding axle 18.

The wheel adjustment system 12 may include various sensors to monitor characteristics of the agricultural implement 10. For example, position sensors 28 may be disposed proximate to each axle 18 to monitor respective current positions of the wheels 16. In some embodiments, the position sensors 28 are coupled to or integrated within actuators 30 (e.g., hydraulic, pneumatic, or electronic actuators) that are configured to drive each axle 18. In some embodiments, the wheel adjustment system 12 includes a speed sensor 32 configured to monitor the ground speed of the agricultural implement 10, a load sensor 34 (e.g., load cell) configured to monitor the weight of the agricultural implement 10, a vertical position sensor 36 configured to monitor the vertical position (e.g., height) of the frame 14 of the agricultural implement 10 and/or of the boom 20 coupled to the frame 14, and/or a seat sensor 38 (e.g., seat switch) configured to monitor whether an operator is seated within the seat of the agricultural implement 10.

As discussed in more detail below, the wheel adjustment system 12 may include a controller 40 that is configured to process signals, such as signals received from the sensors 28, 32, 34, 36, 38, to determine an appropriate action and/or to provide an appropriate output. For example, the controller 40 may be configured to determine whether adjustment of a respective position of one or more wheels 16 is appropriate. In some embodiments, the controller 40 may determine an appropriate rate of adjustment of the position of the wheel 16. In some embodiments, the controller 40 may output a control signal (e.g., to a valve configured to adjust a flow of control fluid to the actuator 30) to cause adjustment of the position of the wheel 16 and/or a signal to provide an indication (e.g., visual and/or audible indication) related to the wheel adjustment system 12. As discussed in more detail below, the controller 40, valve (e.g., proportional valve), and actuator 30 may be part of a proportional control system that enables proportional control of the position of the wheel 16.

Figure 2:
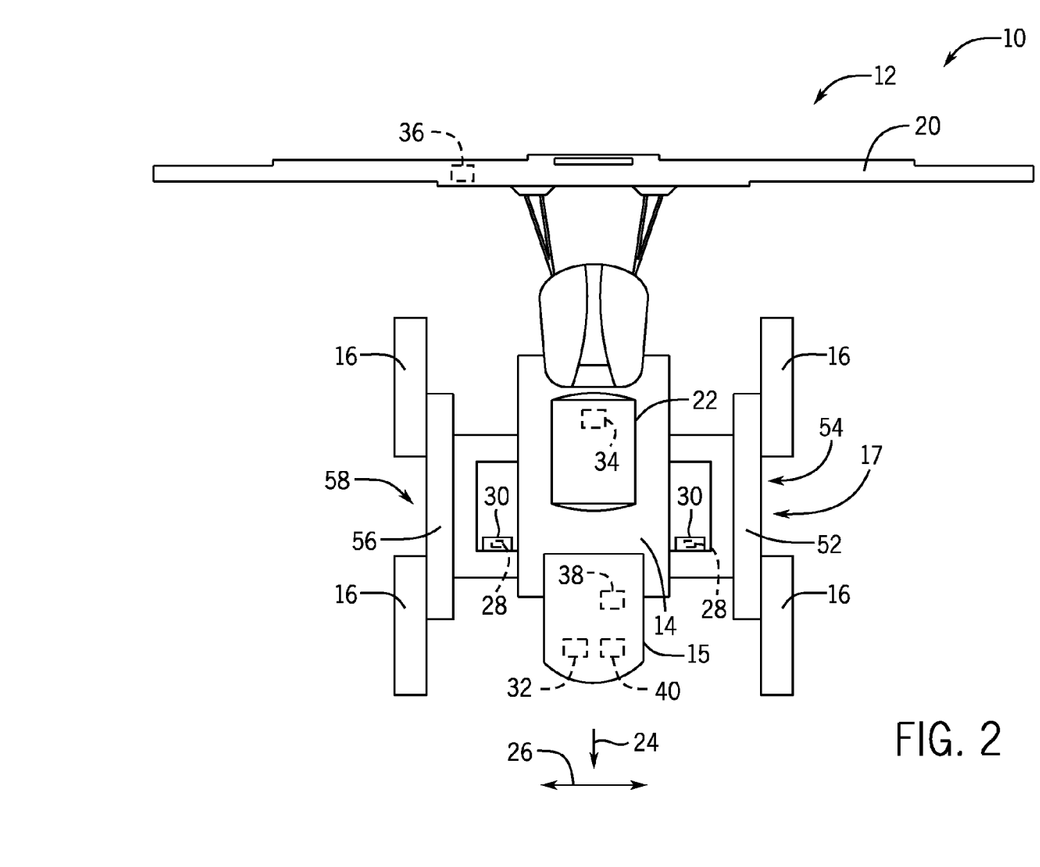
FIG. 2 is a top view of another embodiment of an agricultural implement having the wheel adjustment system of FIG. 1.

As noted above, the wheel adjustment system 12 may be adapted for use with any of a variety of vehicles. For example, FIG. 2 is a top view of another embodiment of an agricultural implement 10 that may include the wheel adjustment system 12. In the illustrated embodiment, the wheel support assembly 17 includes a first movable support member 52 (e.g., adjustable axle or movable frame) that extends between the frame 14 and multiple wheels 16 on a first lateral side 54 (e.g., left side) of the agricultural implement 10 and a second movable support member 56 (e.g., adjustable axle or movable frame) that extends between the frame 14 and multiple wheels 16 on a second lateral side 58 (e.g., right side) of the agricultural implement 10. In the illustrated embodiment, the support members 52, 56 are configured to move laterally 26 relative to the frame 14 (e.g., a fixed portion of the frame 14 that supports the cab 15) to cause the wheels 16 coupled thereto to move laterally 26 relative to the frame 14. Accordingly, the wheels 16 on the first side 54 of the agricultural implement 10 may move simultaneously upon movement of the first movable support member 52, and the wheels on the second side 58 of the agricultural implement 10 may move simultaneously upon movement of the second movable support member 56. As shown, the agricultural implement 10 is configured to travel forward in the direction 24 across the field, and the agricultural implement 10 includes the cab 15, the boom 20, and the storage chamber 22. As shown, the wheel adjustment system 12 includes the sensors 28, 32, 34, 36, 38, the actuators 30, and the controller 40. In some embodiments, multiple actuators 30 may be provided to drive each movable support member 52, 56.

Figure 3:
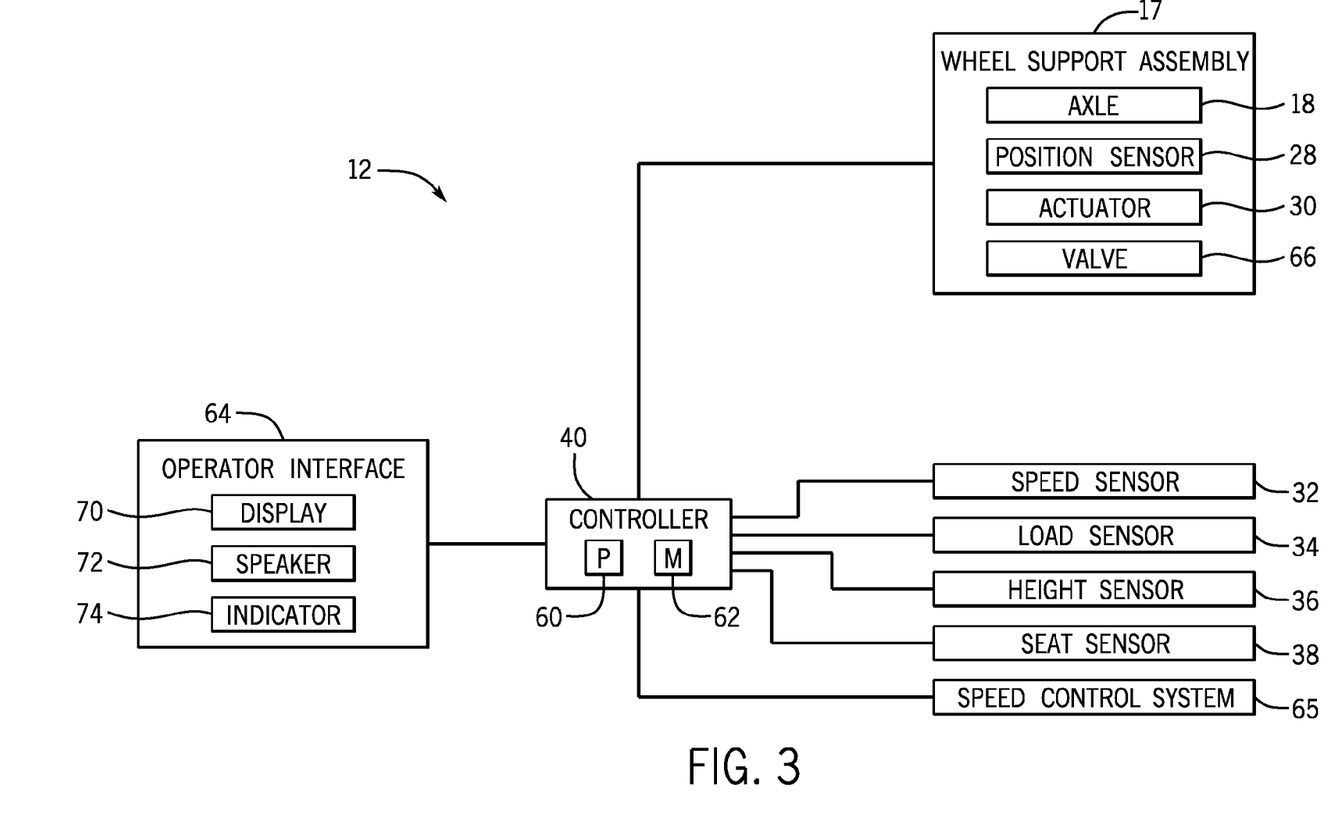
FIG. 3 is a schematic diagram of an embodiment of the wheel adjustment system of FIGS. 1 and 2.

FIG. 3 is a schematic diagram of an embodiment of the wheel adjustment system 12 of FIG. 1. As shown in FIG. 3, the wheel adjustment system 12 includes the controller 40 (e.g., electronic controller), which includes a processor 60 and a memory 62. The controller 40 may be mounted within the agricultural implement 10 and is configured to receive various signals (e.g., inputs) related to the agricultural implement 10. For example, the controller 40 may receive signals indicative of the current position of each wheel 16 (e.g., from the position sensors 28), a signal indicative of a ground speed of the agricultural implement 10 (e.g., from the ground speed sensor 32), a signal indicative of a weight of the agricultural implement 10 (e.g., from the weight sensor 34), a signal indicative of a vertical position of the frame 14 and/or of the boom 20 of the agricultural implement 10 (e.g., from the height sensor 36), a signal indicative of an operator's presence in a seat of the agricultural implement 10 (e.g., from the seat sensor 38), a signal indicative of a desired wheel spacing or desired wheel position (e.g., input by the operator via an operator interface 64 or accessed from the memory 62), or any combination thereof.

The controller 40 may be configured to process the received signals to determine an appropriate action and/or to provide an appropriate output. For example, the controller 40 may be configured to determine whether adjustment of a respective position of one or more wheels 16 is appropriate based on the received signals. In some embodiments, the controller 40 may determine an appropriate rate of adjustment (e.g., inches per second) of the position of the wheel 16 based on the received signals. In some embodiments, the controller 40 may provide a control signal to cause adjustment of the position of the wheel 16 based on the received signals. For example, the controller 40 may provide the control signal to a valve 66 (e.g., proportional valve) that is configured to adjust a flow of control fluid to the actuator 30, thereby adjusting the position of the wheel 16 (e.g., via the illustrated axle 18 or via the support members 52, 56) toward the desired position at the determined rate of adjustment. As discussed in more detail below, in some embodiments, the controller 40 may instruct components of the operator interface 64, such as a display 70, a speaker 72, and/or an indicator 74 (e.g., a multi-colored indicator), to provide an indication (e.g., visual and/or audible indication) related to the wheel adjustment system 12.

With the foregoing in mind, in some embodiments, the controller 40 may determine that adjustment is appropriate if the current position varies from the desired position for the wheel 16 (e.g., varies by more than 0.5, 1, 2, or 3 inches, or more than 1, 5, or 10 percent) and/or if one or more criteria (e.g., ground speed, weight, vertical height, and/or operator presence) are satisfied. For example, the controller 40 may determine that adjustment is appropriate if the ground speed is within a predetermined range of ground speeds (e.g., 0 to 10, 0 to 5, 0.5 to 5, or 1 to 3 miles per hour [mph]), the weight of the agricultural implement 10 is within a predetermined range of weights, the vertical position is within a predetermined range of vertical positions, the operator is present in the seat, or any combination thereof.

In some such cases, the respective predetermined ranges may be fixed (e.g., at manufacturing or by the operator) and stored in the memory 62, and each signal may be evaluated separately and used to determine whether adjustment is appropriate (e.g., if each parameter is within its fixed respective predetermined range, the adjustment is appropriate). In some embodiments, the multiple signals may be evaluated together (e.g., input into an algorithm) to determine whether adjustment is appropriate. Thus, the respective predetermined ranges may vary during operation of the agricultural implement 10. For example, in some embodiments, the predetermined range of ground speeds at which adjustment of the position of the wheel 16 is appropriate may vary based on the weight and/or the vertical position. In certain embodiments, while the weight is relatively low (e.g., below a predetermined threshold), the controller 40 may enable adjustment of the wheels 16 across a relatively large range of ground speeds (e.g., 0 to 10 mph), but while the weight is relatively higher (e.g., above the predetermined threshold), the controller 40 may block adjustment of the wheels 16 at lower ground speeds (e.g., 0 to 0.5 mph) and/or at higher ground speeds (e.g., 5 to 10 mph) of the range of ground speeds. Such a configuration may enable efficient adjustment of the wheels 16 while advantageously reducing wear on the components of the wheel adjustment system 12 and/or improving stability, for example.

In certain embodiments, the controller 40 may determine the appropriate rate of adjustment of the position of the wheel 16 based on the ground speed, the weight, the vertical position, or any combination thereof. In some embodiments, the appropriate rate of adjustment may vary continuously and/or proportionally with the ground speed over the predetermined range of ground speeds. In some embodiments, the appropriate rate of adjustment may vary linearly, exponentially, or according to any suitable curve (e.g., bell curve), with the ground speed over the predetermined range of ground speeds. As noted above, the controller 40 may receive and evaluate the weight and/or the vertical position of the agricultural implement 10 to determine the appropriate rate of adjustment. Accordingly, in some embodiments, the appropriate rate of adjustment may vary continuously and/or proportionally with the weight and/or the vertical position over the predetermined respective ranges. In some embodiments, the appropriate rate of adjustment may vary linearly, exponentially, or according to any suitable curve (e.g., bell curve), with the weight and/or the vertical position over the predetermined respective ranges.

For example, the controller 40 may be configured to determine that a first rate of adjustment is appropriate at a first, relatively slow ground speed(s) within the predetermined range of ground speeds and that a second, different rate of adjustment is appropriate at a second, relatively faster ground speed(s) within the predetermined range of ground speeds. In some such cases, the first rate may be relatively slower, and the second rate may be relatively faster, which may reduce wear on certain components of the agricultural implement 10 at lower ground speeds. In some such cases, the first rate may be relatively faster, and the second rate may be relatively slower, which may increase stability of the agricultural implement 10 at higher ground speeds. The controller 40 may be configured to generally balance efficient adjustment of the position of the wheel 16, wear on the components, and stability.

As noted above, the controller 40 may consider the ground speed, the weight, and/or the vertical position together to determine the appropriate rate of adjustment of the position of the wheel 16. For example, in some embodiments, the first ground speed(s) at which the first rate of adjustment of the position of the wheels 16 is appropriate may vary based on the weight and/or the vertical position. In certain embodiments, at a given ground speed(s), the rate of adjustment may be relatively faster while the weight and/or the vertical position is relatively low (e.g., below respective predetermined thresholds or at a first respective value) and the rate of adjustment may be relatively slower while the weight and/or the vertical position is relatively high (e.g., above the predetermined threshold or at a second respective value).

In some embodiments, the controller 40 may be configured to generate and to provide a control signal to control (e.g., open) the valve 66 to provide control fluid to the actuator 30 while the agricultural implement 10 is stationary. Such control signals may cause the wheel 16 to move laterally at a first rate while the agricultural implement 10 is stationary. In some such embodiments, the controller 30 may control the valve 66 to a first position that enables a first flow of control fluid (e.g., at a first rate) while the agricultural implement 10 is stationary and control the valve 66 to increase the flow of the control fluid to increase the rate of adjustment of the position of the wheel 16 as the agricultural implement's 10 ground speed increases from the stationary position. In some embodiments, if the agricultural implement 10 remains stationary for more than a predetermined period of time (e.g., 5, 10, 20, or 30 seconds) and/or if the agricultural implement's 10 ground speed remains below a threshold (e.g., 0.5 mph) for the predetermined period of time after opening the valve 66, the controller 30 may block further adjustment of the position of the wheels 16 (e.g., by controlling the valve 66 to a closed position). In some embodiments, the controller 40 may provide an indication (e.g., via components of the operator interface 64) instructing the operator to increase the ground speed of the agricultural implement 10 to continue and/or to resume adjustment of the wheel 16.

In some embodiments, the controller 40 may not control the valves 66 and/or may block movement of the wheels 16 while the agricultural implement 10 is stationary. In some embodiments, if the controller 40 receives the signal indicative of the desired position of the wheel 16 while the ground speed is outside of the range of predetermined ground speeds (i.e., while stationary), then the controller 40 may not immediately initiate adjustment of the wheel 16. However, if the ground speed moves within the range of predetermined ground speeds within a predetermined time (e.g., 3, 5, 10, 15, 20, or 30 seconds) after receipt of the desired position, the controller 40 will then open the valve 66 to cause adjustment of the wheel 16 toward the desired position. In some such embodiments, the controller 40 may provide an indication (e.g., via components of the operator interface 64) of the predetermined range of ground speeds and/or the predetermined time to enable the operator to effect adjustment of the wheel 16 to the desired position. Such configurations may enable the operator to set the desired wheel spacing while stationary or at low ground speeds, while advantageously reducing wear on the components of the adjustable axle assembly 12, for example.

In some embodiments, the controller 40 may be configured to block adjustment (e.g., block initiation of movement or stop movement by controlling the valve 66 to a closed position) of the wheels 16 under various circumstances. For example, the controller 40 may block adjustment of the wheels 16 if the ground speed, the weight, and/or the vertical position are outside of the respective predetermined ranges. In some embodiments, the controller 40 may be configured to block adjustment of the wheels 16 if the signal from the seat sensor 38 indicates that the operator is not present within the seat and/or the controller 40 may be configured to block adjustment of the wheels 16 if the current position matches the desired position (e.g., within 0.5, 1, 2, 3, or more inches or within 1, 2, 3, 4, 5 or 10 percent).

In some embodiments, the controller 40 is configured to limit the ground speed of the agricultural implement 10 during adjustment of the position of the wheel 16. For example, while the controller 40 controls the valve 66 to provide the control fluid to the actuator 30, the controller 40 may also control a speed control system 65 of the agricultural implement 10 to limit the ground speed of the agricultural implement 10 and/or to maintain the ground speed within the predetermined range of ground speeds. In some such embodiments, if the operator attempts to increase and/or decrease the ground speed outside of the predetermined range of ground speeds during adjustment of the position of the wheel 16, the controller 40 may provide an indication (e.g., via components of the operator interface 64) that the ground speed is limited during the adjustment and may not be changed. In some embodiments, the operator may override the ground speed limiting function of the controller 40 to quickly stop adjustment of the wheel 16 and enable operator adjustment of the ground speed by selecting an appropriate override input (e.g., a virtual button on the display 70 or other actuator within the cab 15).

In some embodiments, the controller 40 is configured to provide an indication (e.g., visual and/or audible indication) related to the current position of the wheels, the ground speed, the predetermined range of ground speeds, the weight, the predetermined range of weights, the vertical position, the predetermined range of vertical positions, a current rate of adjustment, operator instructions or feedback related to changes in operation of the agricultural implement 12 that will change the rate of adjustment, or the like. The indication may be provided via various components, such as the display 70, the speaker 72, and the indicator 74, that together form the operator interface 64. For example, in some embodiments, the display 70 may be configured to provide a numerical indicator of the current position of each wheel 16 and/or a numerical indicator of the desired position of each wheel 16. By way of another example, in some embodiments, the display 70 and/or the speaker 72 may provide visual (e.g., text) or audible (e.g., spoken) instructions to increase or to decrease the ground speed, weight, and/or boom height, in order to increase the rate of adjustment, to increase or to decrease the ground speed, weight, and/or boom height to enable adjustment of the wheels 16, or the like. The display 70 may be configured to receive operator inputs, such as the desired wheel position for each wheel 16, and to provide the operator inputs to the controller 40. The speaker 72 may be configured to provide a chime (e.g., beep) or other audible sound (e.g., spoken message) in response to receipt of the signal indicative of the desired position at the controller 40, in response to the wheel 16 being located outside of a range about the desired position, and/or during adjustment of the wheel 16.

In some embodiments, the indicator 74 may be a multi-colored indicator (e.g., a light, a lighted button, etc.) and may be positioned within the cab 15 (e.g., on an armrest or console) or may be a virtual indicator (e.g., virtual light or virtual button) on the display 70. In some embodiments, the indicator 74 may be an actuator (e.g., a button) that is configured to receive an input from the operator. For example, actuation of the indicator 74 may instruct the controller 40 to adjust the position of the wheel 16 to a particular desired position (e.g., preset position stored in the memory 62). In some embodiments, actuation of the indicator 74 for more than a predetermined amount of time (e.g., 1, 2, 3, 4, 5, or more seconds) may instruct the controller 40 to adjust the position of the wheel 16 to a particular desired position, such as another preset position, an innermost position, or an outermost position. In some embodiments, actuation of the indicator 74 more than once within a predetermined amount of time (e.g., two actuations within 1, 2, 3, 4, 5, or more seconds) may instruct the controller 40 to adjust the position of the wheel 16 to another particular desired position (e.g., different than the position(s) instructed by a single actuation or by holding the indicator 74), such as another preset position, an innermost position, or an outermost position. Furthermore, the indicator 74 may illuminate with various colors to provide information related to the wheel 16 position and/or the adjustment process to the operator. For example, the indicator 74 may illuminate with a first color while the wheel 16 is moving toward the particular desired position, a second color while the wheel 16 is moving to the another desired position (e.g., the innermost or outermost position), and/or a third color if the current position of the wheel 16 does not match the desired position. The indicator 74 may illuminate continuously or in a blinking pattern based on the current status of the wheel adjustment system 12. For example, the indicator 74 may be solid while the current position matches the desired position and may blink during adjustment of the position of the wheel 16. In some embodiments, the indicator 74 may illuminate with various colors that indicate the rate of adjustment. For example, the indicator 74 may illuminate with a first color while the rate of adjustment is relatively slow and with a second color while the rate of adjustment is relatively fast.

The controller 40 disclosed herein is an electronic controller having the processor 60 and the memory device 62. The controller 40 may also include one or more storage devices and/or other suitable components. The processor 60 may be used to execute software, such as software for determining whether adjustment of the wheels 16 is appropriate, an appropriate rate for adjustment of the wheels, controlling the valves 66, providing indications, and so forth. Moreover, the processor 40 may include multiple microprocessors, one or more "general-purpose" microprocessors, one or more special-purpose microprocessors, and/or one or more application specific integrated circuits (ASICS), or some combination thereof. For example, the processor 40 may include one or more reduced instruction set (RISC) processors.

The memory device 62 may include a volatile memory, such as random access memory (RAM), and/or a nonvolatile memory, such as ROM. The memory device 34 may store a variety of information and may be used for various purposes. For example, the memory device 62 may store processor-executable instructions (e.g., firmware or software) for the processor 60 to execute, such as instructions for determining whether adjustment of the wheels 16 is appropriate, an appropriate rate for adjustment of the wheels, controlling the valves 66, providing indications, and so forth. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., predetermined ranges, baseline weight of the agricultural implement, desired positions of the wheels 16, etc.), instructions (e.g., software or firmware for determining whether adjustment of the wheels 16 is appropriate, an appropriate rate for adjustment of the wheels, controlling the valves 66, providing indications, and so forth), and any other suitable data.

Figure 4:
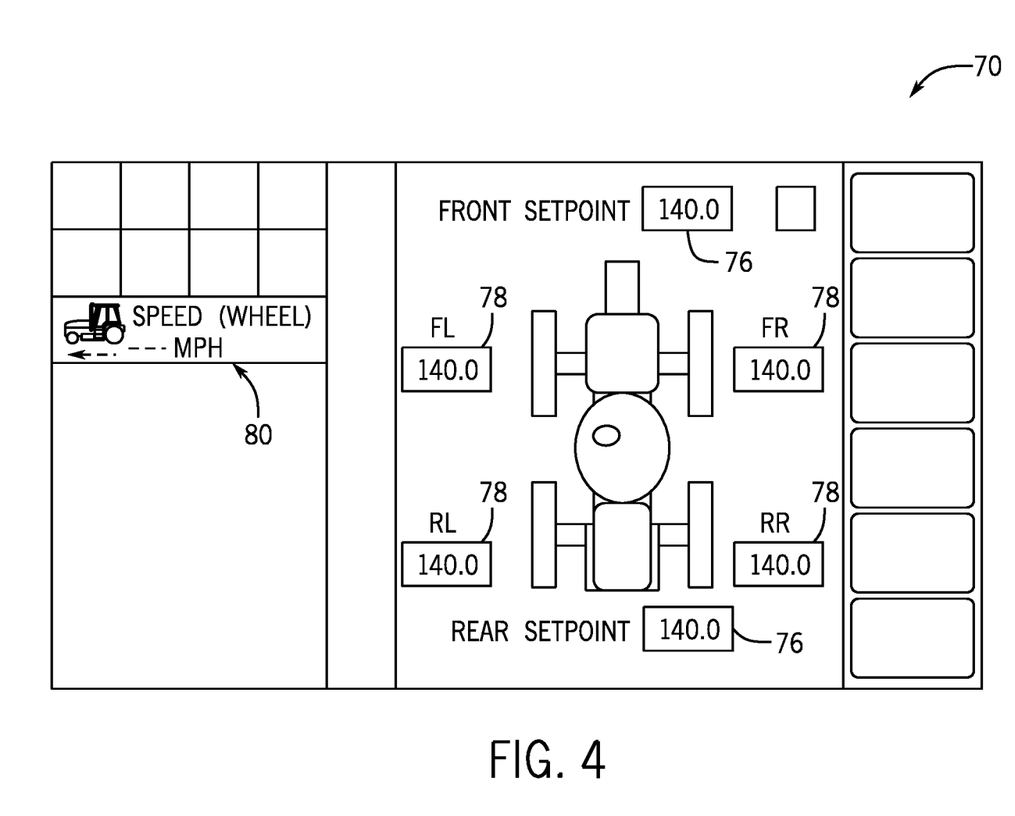
FIG. 4 is a schematic diagram of an embodiment of a display that may be used as part of the wheel adjustment system of FIG. 3.

FIG. 4 is an embodiment of the display 70 that may be used in the wheel adjustment system 12 of FIG. 3. As shown, the display 70 is a touchscreen display and enables the operator to view various indications. As shown, the display 70 provides a numerical indicator 76 of the desired wheel spacing (e.g., desired position) of each wheel 16 and a numerical indicator 78 of the current position of each wheel 16. In some embodiments, the display 70 may enable the operator to input the desired wheel spacing and/or position of the wheel 16. For example, the operator may use the display 70 to input the desired position of the wheel 16 by typing in a numerical value or selecting from one or more preset desired positions stored in and accessible from the memory 62. As shown, the display 70 may provide other indications, such as a ground speed 80 of the agricultural implement 10 and any other of the other indications disclosed herein. In some embodiments, the display 70 may include a representation of the agricultural implement 10 and/or may include bars extending between the wheels 16 with corresponding numerical indicators representative of the current position of each wheel 16 and/or the spacing between wheels 16.

Figure 5:
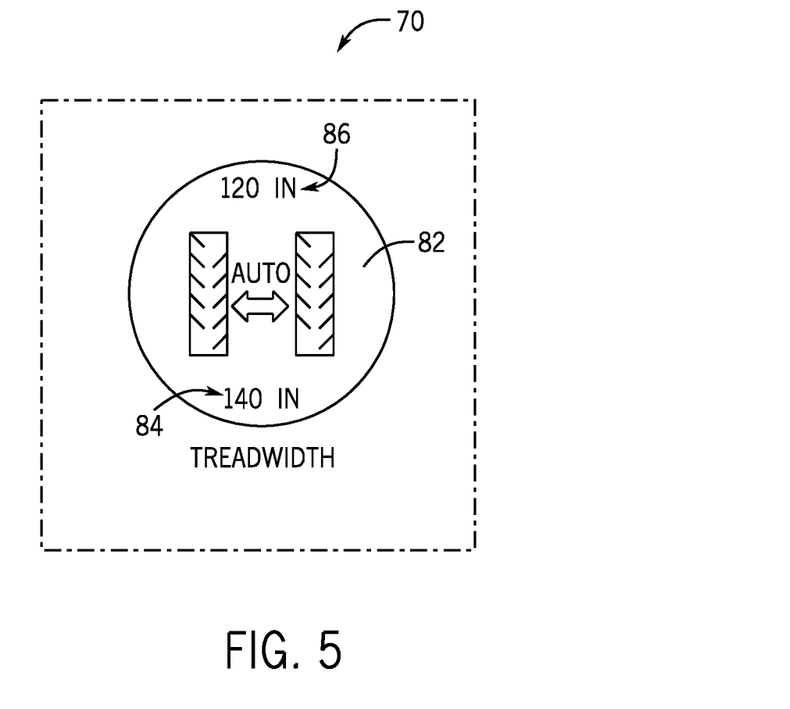
FIG. 5 illustrates a portion of a display that may be used as part of the wheel adjustment system of FIG. 3.

FIG. 5 illustrates a portion of a display 70 that may be used as part of the wheel adjustment system 12 of FIG. 3. As shown, the display 70 is a touchscreen display that includes a virtual button 82. In some embodiments, actuation of the virtual button 82 may provide a signal indicative of the desired position (e.g., a preset position) of the wheels 16 to the controller 40. For example, one or more desired positions of the wheel 16 may be saved to the memory 62 (e.g., at manufacturing or via operator input). The operator may subsequently select a desired position of the wheel 16 via actuation of the virtual button 82. In some embodiments, the virtual button 82 may be configured to enable the operator to select one of multiple different stored or preset desired positions (e.g., by holding the virtual button 82 for various periods of times or by tapping the virtual button 82 to scroll through and select one of the multiple different desired positions). In some embodiments, multiple different virtual buttons 82 each corresponding to a different stored or preset desired position may be provided on the display 70. One virtual button 82 may be provided to adjust the wheel spacing between front and rear wheels (e.g., in the agricultural implement 10 of FIG. 2) or multiple virtual buttons 82 may be provided to separately adjust front and rear wheel spacing or a position of each wheel 16. The virtual button 82 may provide a numerical indicator 84 of the desired position of the wheel 16 and/or a numerical indicator 86 of the current position of the wheel 16. The virtual button 82 may additionally or alternatively include any of the features of the indicator 74 described above, such as the multicolored illumination.

Figure 6:
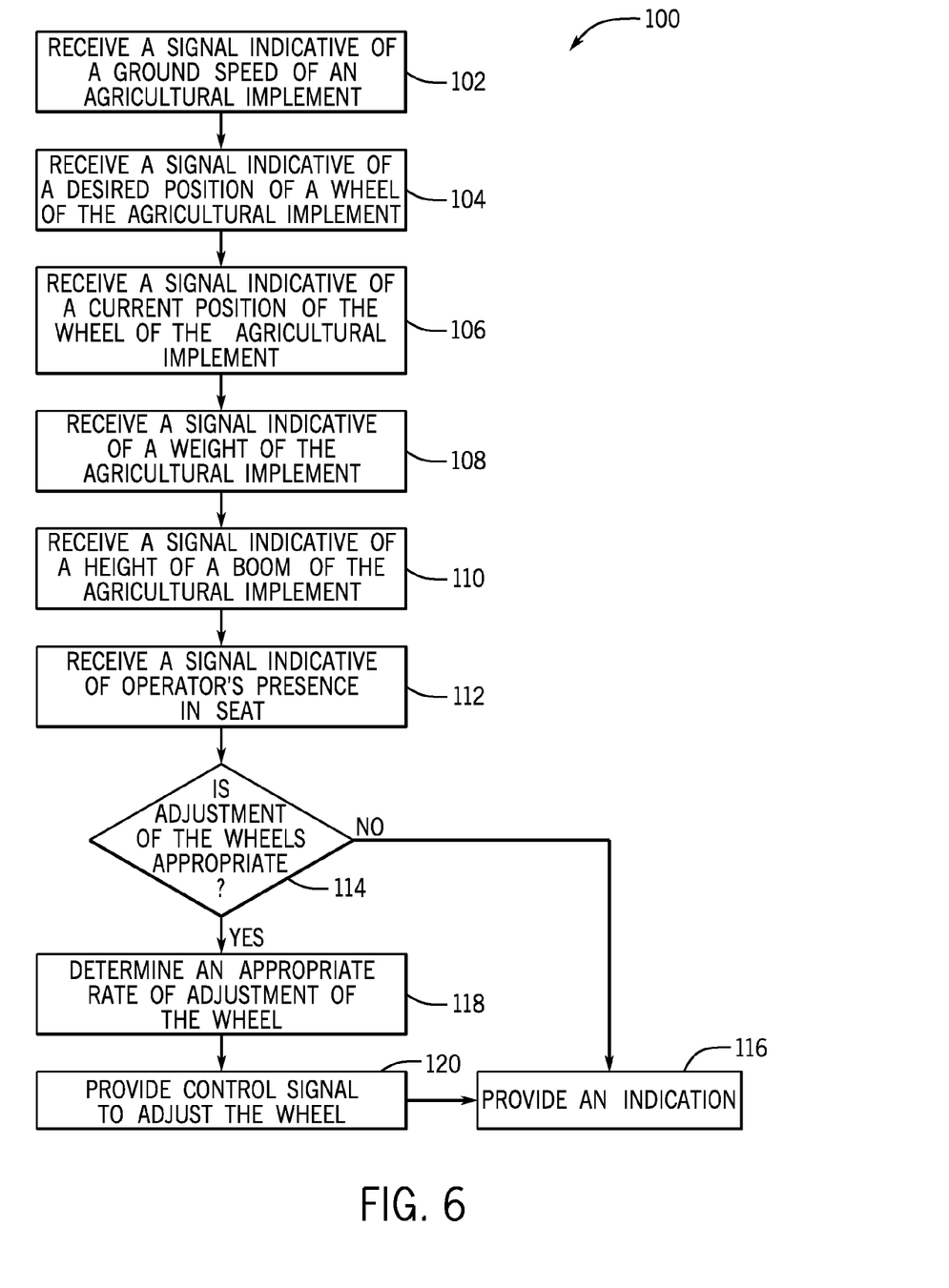
FIG. 6 is a flow chart of an embodiment of a method for operating the wheel adjustment system of FIG. 3.

FIG. 6 is a flow chart of a method 100 for adjusting a position of the wheel 16 of the agricultural implement 10, in accordance with an embodiment. The method 100 includes various steps represented by blocks. It should be noted that the method 100 may be performed as an automated procedure by a system, such as the wheel adjustment system 12. Although the flow chart illustrates the steps in a certain sequence, it should be understood that the steps may be performed in any suitable order, certain steps may be omitted, and certain steps may be carried out simultaneously, where appropriate.

In step 102, the controller 40 may receive a first signal indicative of a ground speed of the agricultural implement 10. As discussed above, the first signal may be provided by the speed sensor 32 coupled to the agricultural implement 10. In step 104, the controller 40 may receive a second signal indicative of a desired position of the wheel 16 of the agricultural implement 10. The second signal may be provided by the operator via input of a numerical value at the display 70, via selection of a particular desired position from multiple desired positions stored in the memory 62, or actuation of the indicator 74, for example. In step 106, the controller 40 may receive a third signal indicative of a current position of the wheel 16 of the agricultural implement 10. The third signal may be provided by the position sensor 28, which may be coupled to the actuator 30 that drives the wheel support assembly 17, such as the axle 18 or the support members 52, 56. In step 108, the controller 40 may receive fourth signal indicative of a weight of the agricultural implement 10. The fourth signal may be provided by the weight sensor 34, which may be coupled to a suitable location of the agricultural implement 10 (e.g., at or below the storage chamber 22) to monitor the weight of the agricultural implement 10. In step 110, the controller 40 may receive a fifth signal indicative of a height of the frame 14 or of the boom 20 of the agricultural implement 10. The fifth signal may be provided by the vertical position sensor 36, which may be coupled to the frame 14 or to the boom 20. In step 112, the controller 40 may receive a sixth signal indicative of the operator's presence in the seat of the agricultural implement 10. The sixth signal may be provided by the seat sensor 35 coupled to the seat.

In step 114, the controller 40 may determine whether adjustment of one or more wheels 16 is appropriate based on some or all of the signals received in steps 102-112. As discussed above, in some embodiments, the controller 40 may determine that adjustment is appropriate if the current position varies from the desired position for the wheel 16 and/or if one or more vehicle criteria (e.g., ground speed, weight, vertical height, and/or operator presence) are satisfied. If adjustment of the position of the wheel 16 is inappropriate, the controller 40 may provide an indication that adjustment is inappropriate and/or an indication of why the adjustment is inappropriate (e.g., the one or more criteria are not met, the current position matches the desired position, or the like), via the operator interface 64, as shown in step 116. As noted above, the indication may include operator instructions or feedback related to recommended changes in operation of the agricultural implement 12 (e.g., increase or decrease speed, weight, and/or vertical position, resume a seated position, or the like) needed to satisfy the one or more vehicle criteria. Additionally or alternatively, in some embodiments, the controller 40 may be configured to block adjustment of the position of the wheel 16 (e.g., by closing the valve 66) of the agricultural implement 10 if one or more vehicle criteria are not satisfied. For example, the controller 40 may block adjustment of the position of the wheel 16 if the sixth signal indicates that the operator is not seated in the seat.

If adjustment of the wheel 16 is appropriate, in step 118, the controller 40 may determine an appropriate rate of adjustment of the wheel 16 based on some or all of the signals received in steps 102-112. As discussed above, in some embodiments, the appropriate rate of adjustment may vary continuously and/or proportionally with the ground speed, the weight, and/or the vertical position over the predetermined respective ranges. In some embodiments, the appropriate rate of adjustment may vary linearly, exponentially, or according to any suitable curve (e.g., bell curve) or function, with ground speed, the weight, and/or the vertical position over the predetermined respective ranges.

In step 120, the controller 40 may output a control signal to adjust a position of the wheel 16 of the agricultural implement 10 based on some of all of the signals received in steps 102-112. For example, the controller 40 may provide the control signal to the valve 66 that is configured to adjust a flow of control fluid to the actuator 30, thereby adjusting the position of the wheel 16 toward the desired position at the determined rate of adjustment. As discussed above, in some embodiments, the controller 40 may be configured to generate and to provide the control signal to open the valve 66 to provide control fluid to the actuator 30 while the agricultural implement 10 is stationary.

In some embodiments, in step 116, the controller 40 may provide an indication before, during, or after adjustment of the position of the wheel 16. For example, in some embodiments, the controller 40 may instruct components of the operator interface 64, such as the display 70, the speaker 72, and/or the indicator 74, to provide an indication (e.g., visual and/or audible indication) related to the current position of the wheels, the ground speed, the predetermined range of ground speeds, the weight, the predetermined range of weights, the vertical position, the predetermined range of vertical positions, a current rate of adjustment, operator instructions or feedback related to changes in operation of the agricultural implement 12 that will change the rate of adjustment, or the like.

The embodiments disclosed above generally relate to an automatic mode of operation in which the controller 40 receives the desired position of the wheel 16 (e.g., via operator input or selection of a numerical value related to the desired position) and automatically moves the wheel 16 toward the desired position at the appropriate rate, if such adjustment is appropriate (e.g., based on the ground speed, weight, vertical position, and/or operator's presence). However, the wheel adjustment system 12 may be configured to additionally or alternatively operate in a manual mode of operation in which the controller 40 enables the operator to hold a switch (e.g., virtual button on the display) to manually move the wheel 16 toward a desired position. In some embodiments, the controller 40 may only enable such manual adjustment of the wheel 16 if the criteria for adjustment are met (e.g., based on the ground speed, weight, vertical position, and/or operator's presence) in the manner discussed above. In some cases, in the manual mode, the controller 40 may determine the appropriate rate of adjustment and cause the wheel 16 to move at the appropriate rate given the various conditions in the manner set forth above. Certain features and steps are discussed with respect to one wheel 16; however, it should be understood that multiple wheels 16 may be adjusted simultaneously or at different times via the techniques disclosed herein. Additionally, it should be understood that the agricultural implement 10 may be an autonomous vehicle, and in such cases, the operator interface 64 may be located at a base station that is remote from and in wireless communication with the agricultural implement 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wheel adjustment system for an agricultural implement, comprising:
a controller having a processor and a memory, wherein the processor is configured to:
receive a first signal indicative of a ground speed of the agricultural implement;
receive a second signal indicative of a desired position of a wheel of the agricultural implement;
receive a third signal indicative of a current position of the wheel of the agricultural implement; and
output a control signal to adjust a position of the wheel of the agricultural implement based on the first, second, and third signals, wherein a rate of adjustment of the position of the wheel varies based on the first signal.

2. The system of claim 1, wherein the processor is configured to receive a fourth signal indicative of a weight of the agricultural implement, and the rate of adjustment of the position of the wheel varies based on the fourth signal.

3. The system of claim 2, comprising a load cell configured to be coupled to the agricultural implement, wherein the load cell is configured to monitor the weight of the agricultural implement and to provide the fourth signal to the processor.

4. The system of claim 1, comprising a seat switch configured to be coupled to a seat of the agricultural implement, wherein the seat switch is configured to monitor an operator's presence in the seat and to provide a fourth signal indicative of the operator's presence in the seat to the processor, and the processor is configured to block adjustment of the position of the wheel of the agricultural implement if the fourth signal indicates that the operator is not present in the seat.

5. The system of claim 1, wherein the processor is configured to receive a fourth signal indicative of a height of a boom of the agricultural implement, and the rate of adjustment of the position of the wheel varies based on the fourth signal.

6. The system of claim 1, wherein the processor is configured to cause a multi-colored indicator to illuminate with a first color during adjustment of the position of the wheel and to illuminate with a second color, different from the first color, when the current position of the wheel corresponds to the desired position of the wheel.

7. The system of claim 1, comprising a touchscreen display that is configured to enable an operator to input the desired position of the wheel.

8. The system of claim 7, wherein the touchscreen display is configured to provide numerical indications of the desired position of the wheel and of the current position of the wheel.

9. The system of claim 1, wherein the rate of adjustment increases proportionally with speed while the agricultural implement travels between 0.5 and 5 miles per hour.

10. The system of claim 1, wherein the controller is configured to provide a speed control signal to a speed control system of the agricultural implement to limit the ground speed of the agricultural implement during adjustment of the position of the wheel.

11. The system of claim 1, comprising a position sensor integrated within an actuator that is configured to drive the wheel laterally relative to a frame of the agricultural implement, wherein the position sensor is configured to provide the third signal to the processor.

12. A wheel adjustment system for an agricultural implement, comprising:
a controller having a processor and a memory, wherein the processor is configured to:
receive a first signal indicative of a ground speed of the agricultural implement;
receive a second signal indicative of a desired position of a wheel of the agricultural implement;
receive a third signal indicative of a current position of the wheel of the agricultural implement;
receive a fourth signal indicative of a weight of the agricultural implement; and
output a control signal to adjust a position of the wheel of the agricultural implement based on the first, second, third, and fourth signals.

13. The system of claim 12, wherein the control signal causes a rate of adjustment of the position of the wheel to vary based on the first and fourth signals.

14. The system of claim 12, comprising a load cell configured to be coupled to the agricultural implement, wherein the load cell is configured to monitor the weight of the agricultural implement and to provide the fourth signal to the processor.

15. The system of claim 14, wherein the processor is configured to receive a fifth signal indicative of a height of a boom of the agricultural implement, and the control signal varies based on the fifth signal.

16. The system of claim 12, wherein the processor is configured to cause a multi-colored indicator to illuminate with a first color during adjustment of the position of the wheel and to illuminate with a second color, different from the first color, when the current position of the wheel corresponds to the desired position of the wheel.

17. A method of operating a wheel adjustment system for an agricultural implement, comprising using a controller having a processor and a memory to:
receive a first signal indicative of a ground speed of the agricultural implement;
receive a second signal indicative of a desired position of a wheel of the agricultural implement;
receive a third signal indicative of a current position of the wheel of the agricultural implement;
receive a fourth signal indicative of a weight of the agricultural implement; and
output a control signal to adjust a position of the wheel of the agricultural implement based on the first, second, third, and fourth signals.

18. The method of claim 17, comprising, using the controller, varying a rate of adjustment of the position of the wheel based on the first and the fourth signals.

19. The method of claim 17, comprising, using the controller, instructing a multi-colored indicator to illuminate with a first color during adjustment of the position of the wheel and to illuminate with a second color, different from the first color, when the current position of the wheel corresponds to the desired position of the wheel.

20. The method of claim 17, comprising, using the controller, varying a rate of adjustment of the position of the wheel proportionally with the ground speed of the agricultural implement while the agricultural implement travels between 0.5 and 5 miles per hour.

* * * * *